United States Patent Office  3,070,471
Patented Dec. 25, 1962

3,070,471
SOLID COMPOSITE PROPELLANT COMPOSITION
AND METHOD OF PREPARATION
Herman T. Roy, Cleveland Heights, Ohio, assignor to The
General Tire and Rubber Company, Akron, Ohio, a
corporation of Ohio
No Drawing. Filed Jan. 23, 1950, Ser. No. 140,150
5 Claims. (Cl. 149—20)

This invention relates to jet propulsion and more particularly to propellant charges of the solid type useful in rocket motors.

It is a known practice in the operation of rocket motors to burn in the combustion chamber of the motor a propellant charge in the form of a solid mass comprising fuel and oxidizing materials so as to produce gases of combustion, and to eject the gases at high velocity through an exhaust nozzle from the chamber so as to create the propulsive force.

Such propellant substances have comprised fuel and oxidizer for burning it, contained in a matrix which binds the mass together; and resins have been proposed for use as the binding matrix.

It is often desirable that the exhaust from a rocket motor shall be substantially non-toxic and smokeless, particularly when used for military purposes; and for the purpose, there have been proposed resins containing oxygen for the combustion in the form of nitro ($NO_2$) groups. It has been proposed to compound resins of this character by polymerizing the monomer with a material containing the desired nitro groups. However, a difficulty has been that most monomeric materials will not polymerize in the presence of nitro compounds, which apparently tend to act as an inhibitor of polymerization.

Pursuant to my investigations, I have found that a polymer can be produced from a mixture of a saturated nitro aliphatic compound, such as a nitroparaffin, with a saturated aliphatic ester of acrylic or methacrylic acid. The monomeric liquid ester will readily polymerize even in the presence of the nitroparaffin. While substituted esters of acrylic or methacrylic acid will do, it is preferred to use the unsubstituted ester.

More generally, I have discovered that mixtures of vinyl type monomers containing a

grouping with saturated nitro aliphatic compounds will polymerize to form suitable polymers containing nitro groups, provided the monomer has an $e$ value at least as great as that of methyl methacrylate and a Q value (factor indicating monomer reactivity for copolymerization) greater than that of vinylidene chloride. The term "$e$ value" as used herein is a value designating the intensity of electric charge adjacent the double bond of the vinyl group in the compound; "$e$ value" and "Q value" are defined in the Journal of Polymer Science, vol. III, No. 5, pages 772–775, 1948, in an article entitled "Some Relative Monomer Reactivity Factors," by Dr. Charles C. Price.

In the course of my investigations, I have discovered that materials having a lower $e$ value than that of methyl methacrylate, for example, such materials as vinyl acetate, butadiene, and styrene, do not polymerize in the presence of nitro aliphatic compounds. Among those vinyl materials which do polymerize in the presence of nitro aliphatic compounds, are those set forth in the following table, together with their $e$ values and approximate Q values, which are based on the above-mentioned article in the Journal of Polymer Science.

| Monomer | $e$ Value | Q Value |
|---|---|---|
| Methyl methacrylate | 0.4 | 0.7 |
| Methyl acrylate | 0.6 | 0.5 |
| Acrylonitrile | 1.4 | 0.7 |
| Methyl vinyl ketone | 0.7 | 1.0 |
| B-chloroethyl acrylate | 0.9 | 0.45 |
| Dichlorostyrene | 0.75 | 1.6 |

In considering these $e$ values it should be understood, however, that the $e$ value is a relative quantity whose absolute value is subject to arbitrary selection of some value as a zero base. In accordance with my discovery, however, the base of the $e$ values is not important, as my discovery is simply that regardless of the base, the $e$ value should be at least as great as that of methyl methacrylate.

In compounding mixtures of nitro aliphatic compounds and polymerizable materials according to this invention, the polymerizable material may be mixed with the nitro compound either in monomeric form or in partially polymerized form, or as a mixture of a monomer with a polymerized or partially polymerized resin, the principal criterion being that the resin be sufficiently liquid to mix with the nitro compound before curing. Where partially polymerized resin is used, it is herein called a "prepolymer." In compounding mixtures of nitro aliphatic compounds and the polymerizable materials, the monomeric polymerizable materials or the mixture of monomeric materials and polymerized or partially polymerized materials, are mixed with a suitable free radical-producing polymerization catalyst which is preferably soluble in the monomeric materials. Generally, the free radical-producing catalysts are "per" compounds, such as tertiary butyl perbenzoate; isopropyl percarbonate; and aliphatic or aromatic peroxide, including benzoyl peroxide, methyl ethyl ketone peroxide, tertiary butyl hydrogen peroxide, cumene hydrogen peroxide, etc., although the heavy metal salts of the unsaturated acids, such as cobalt, manganese, resinates, linoleates and maleates also activate the polymerization to a considerable degree and may be used alone or with other of the free radical-producing catalysts.

The amount of catalyst may be varied, as desired; and the rate of polymerization usually increases with increasing amounts of polymerization catalyst, up to about 5% or so, and molecular weight usually decreases. This latter is because of the fact that when there are a larger number of free radicals started, the average length of the chains that result will be smaller. Because of this fact, the amount of catalyst usually preferred is about .05% to 2% of the weight of the monomeric materials.

The nitro aliphatic compounds which are considered the most important and are preferred for use with the polymerizable monomeric vinyl materials according to this invention are 2,2-dinitropropane and 2,2-dinitropropanediol-1,3. It will be understood, however, that other saturated nitro aliphatic compounds may be used. In general any of the known nitroparaffins may be used, including nitromethane, tetranitromethane, nitroform nitropropane (either 1-nitropropane or 2-nitropropane), the nitrobutanes, etc. In the nitro alcohol group there may be used especially those in which the nitro groups and OH groups are not tied to the same carbon atom; for example, nitro ethanol, nitro propanol, and its isomers, nitrobutanol and its isomers, etc.; and also there may be used the dinitro alcohols, the nitro diols, and the dinitrodiols. Similarly, nitro aliphatics from the family of the nitro amines may be used provided the nitro and the amino groups are not on the same carbon atom.

Referring to the preferred form of the invention involving the saturated aliphatic esters of acrylic or methacrylic acid as the resin, there may be used not only methyl methacrylate or methyl acrylate as set forth in the above table, but also ethyl acrylate, propyl acrylate, butyl acrylate, amyl acrylate, etc., and ethyl methacrylate, propyl methacrylate, butyl methacrylate, amyl methacrylate, etc., and also the iso compounds, such as the isopropyl, isobutyl and isoamyl acrylates or methacrylates, and also mixtures of any of these esters.

Referring again to the above table of $e$ values of resins, it should also be understood that any members of the chemical families represented by substances in this table may be used for the resin. For example, the relatively large number of compounds in the families in the ketone group comprising methyl vinyl ketone may be used. Likewise, mixtures of any two or more of the polymerizable monomerizable monomeric materials having the above-designated essential characteristics may be used with or without an added thickening agent, such as a polymer dissolved therein. The only limits imposed on the selection of resin from this group is that the $e$ value should be at least as great as that of methyl methacrylate and the Q value should be greater than that of vinylidene chloride.

The amount of the nitro compound which is mixed with the resin is not critical and the advantage of the invention in introducing nitro groups into the resin is had as soon as any of the nitro compound is added. The resin functions to physically hold the nitro compounds and very large proportions of the latter may be used relative to the amount of resin present. When the amount becomes greater the dilution of the resin causes the product to have lower strength and physical properties. Generally the nitro compound is introduced in amounts of from about 1% to about 35% or 40% by weight of the mixture of resin and nitro compound when a reasonably high strength product is required. More may be present, however. The proportion of the resin in the preferred mixtures of nitro compound and resin may range from about 99% to about 60% or 65%.

The invention is particularly exemplified by the following examples:

EXAMPLE 1

*Polymerization of Methyl Acrylate in the Presence of 2,2-Dinitropropane*

To 75 grams of distilled methyl acrylate was added 25 grams of 2,2-dinitropropane which is completely soluble. 1 gram of 60% methyl ethyl ketone peroxide was added as a catalyst. The above mixture polymerized to a hard colorless mass in 60 hours at 60° C.

EXAMPLE 2

*Polymerization of Methyl Methacrylate in the Presence of 2,2-Dinitropropanediol-1,3*

To 37 grams of distilled methyl methacrylate was added 12 grams of 2,2-dinitro propanediol-1,3 which is completely soluble. 0.5 gram benzoyl peroxide was added as catalyst. The above mixture polymerized to a hard colorless mass in 60 hours at 60° C.

EXAMPLE 3

*Polymerization of Methyl Methacrylate Prepolymer (Low Molecular Weight Polymer) in the Presence of 2,2-Dinitropropane*

To 45 grams of methyl methacrylate prepolymer was added 10 grams of 2,2-dinitropropane and 0.45 gram of methyl ethyl ketone peroxide catalyst. This was cured at 80° C. for 24 hours, resulting in a hard colorless mass.

It should be recognized that by my invention I have produced and shown how to produce resinous substances containing oxygen in the form of nitro groups; and the particular advantage of this form of oxygen introduction into the resin is that it increases the specific impulse of a propellant containing the resin, especially when the oxygen is limited in quantity.

The nitro-containing resins according to my invention are useful in propellants, regardless of whether sufficient oxygen for complete combustion of the fuel in the resin is contained in the nitro groups. In some cases it is possible to introduce sufficient oxygen in the form of the nitro groups to provide substantially complete or nearly complete combustion of the fuel; while in other cases, the amount of the oxygen present in the nitro groups will be considerably less than that required for complete combustion. It will be understood that in any case where the nitro groups do not furnish sufficient oxygen for complete combustion, the oxygen may be added to the resin in a manner well known in the art. Where such additional oxidizer is to be used, I prefer to use any stable solid inorganic oxidizer. Such oxidizer should be in finely divided form and should be added to the mixture while the resin is in its liquid state. Examples of suitable oxidizers for the purpose are the inorganic substances including the chromates, dichromates, permanganates, nitrates, chlorates and perchlorates, such as the alkali metal salts of these radicals, including sodium, potassium, lithium, rhubidium and caesium; and also the non-metallic salts of the same radicals, such as ammonium and hydrazine. The selection of the oxidizing material depends upon the type of propellant and the specific burning properties desired. The preferred oxidizers are the perchlorates, especially the perchlorates of potassium and ammonium. The amount of oxidizer thus added to the resinous mixture will, of course, depend on how little oxygen is already present in the nitro groups. Where the amount of oxygen present in the nitro groups is relatively small, for example, approaching down toward 1%, the amount of solid oxidizer added to the resinous mixture to provide a completely burnable propellant ordinarily lies between about 45% and 90% by weight of a total propellant composition.

I claim:

1. A method of making a solid propellant composition which comprises mixing 1% to 40% by weight of saturated aliphatic nitro compound with 99% to 60% by weight of at least one polymerizable member of the group consisting of esters of acrylic and methacrylic acids with saturated aliphatic alcohols, acrylo and methacrylo nitrile, and methylvinylketone, incorporating a free radical producing catalyst selected from the group consisting of organic peroxides, organic hydroperoxides, and esters of per acids, and subjecting said mixture to a temperature in the neighborhood of 60° C. to polymerize said polymerizable member to the solid state.

2. The method of claim 1 wherein the mixture is subjected to a temperature in the neighborhood of about 80° C. to polymerize said polymerizable member to the solid state.

3. A solid propellant material produced by the method of claim 1.

4. The method of claim 1 wherein the saturated aliphatic nitro compound is 2,2-dinitro propanediol-1,3 and the polymerizable member is methylmethacrylate.

5. A solid propellant material produced according to claim 1 wherein the polymerizable member is methylmethacrylate.

References Cited in the file of this patent

UNITED STATES PATENTS

| | | |
|---|---|---|
| 2,165,263 | Holm | July 11, 1939 |
| 2,230,240 | Gerhart | Feb. 4, 1941 |
| 2,337,635 | Bogin | Dec. 28, 1943 |
| 2,359,103 | Gerhart et al. | Sept. 26, 1944 |
| 2,378,169 | Agre et al. | June 12, 1945 |
| 2,417,294 | D'Alelio | Mar. 11, 1947 |
| 2,436,204 | D'Alelio | Feb. 17, 1948 |

OTHER REFERENCES

Price in the Journal of Polymer Science, vol. III, No. 5 (1948), pp. 772–775.